March 3, 1959     H. H. KUNZI ET AL     2,875,798
MEAT CHOPPER HAVING AXIALLY RECIPROCATING ANNULAR KNIVES
Filed Nov. 19, 1957     2 Sheets-Sheet 2

INVENTORS
HUGO H. KUNZI
HUGO S. KUNZI

United States Patent Office 2,875,798
Patented Mar. 3, 1959

2,875,798

MEAT CHOPPER HAVING AXIALLY RECIPROCATING ANNULAR KNIVES

Hugo Hermann Kunzi, Baden-Wuerttemberg, and Hugo Siegfried Kunzi, Stuttgart-Feuerbach, Germany Application November 19, 1957, Serial No. 697,497

Claims priority, application Germany November 20, 1956

10 Claims. (Cl. 146—78)

This invention relates generally to food choppers, and is particularly directed to a chopper for cutting all kinds of meat into small or very small pieces even when pervaded by tendons and sinews.

Existing chopping machines for meat or other food materials have the disadvantage of mashing the material, whereby tendons and sinews in the meat remain uncut and the taste of the food material and its digestibility are impaired. In existing meat chopping machines, a conveyor screw pushes the meat through a perforated plate while a multiple-bladed rotating knife cooperates with the perforated plate to cut the meat at it is extruded through the openings of the plate. In such an arrangement, the knife rotates at the same speed as the conveyor screw so that the length of cut is fixed and very fine chopping is impossible. Furthermore, when the food material being processed contains tendons or skin fragments, the openings of the perforated plate tend to be clogged therewith. Pushing such meat through the perforated plate requires the exertion of a considerable pressure by the conveyor screw so that the power required for operating the screw is correspondingly increased. The relatively great pressure exerted by the conveyor screw tends to crush the good meat together with the tendons and sinews so that its nutritional value and appearance are depreciated. Finally, when the openings of the perforated plate become severely clogged, the chopper must be disassembled for removal of the tough meat particles which are jammed in the openings of the perforated plate.

Therefore, minced meat of good quality is frequently prepared by hand using knives and a chopping block. While this procedure avoids crushing of the meat, it is time consuming and tiresome, and it is impossible to mince meat as uniformly by hand as it is with a machine.

Accordingly, it is an object of the present invention to provide a machine for chopping meat and other materials that lend themselves to cutting with knives while avoiding crushing of the food cells and the other disadvantages of the existing machines as mentioned above.

Another object is to provide a chopping machine with interchangeable sets of knives particularly adapted for the processing of different food materials.

A further object of the invention is to provide a chopping machine which is constructed and arranged to avoid the accumulation of residues of the food being processed within the machine that would interfere with the operation thereof.

In accordance with an aspect of this invention, a food chopping machine includes a rotated conveyor screw for feeding the material to be chopped towards a discharge end of a housing, an annular fixed knife at the discharge end of the housing, an inner annular knife adapted to telescope in the discharge end of the housing and to cooperate with the annular fixed knife for effecting the initial cutting of the food material fed thereto by the screw conveyor, while the inner knife and the fixed knife are shaped to define an annular space therebetween, a cylindrical body sliding telescopically over the fixed knife at the discharge end of the housing to define the radially outer wall of the annular space between the fixed knife and the inner knife and having generally radially extending, nozzle-like openings therein through which the food material can be discharged, an outer annular knife extending around the cylindrical nozzle body and held in fixed relationship to the housing, and mechanism for effecting axial reciprocation of the nozzle body and the inner knife with respect to the fixed knife at the discharge end of the housing and the fixed outer knife.

Further, in accordance with an aspect of the invention, the inner annular knife and the nozzle body are axially reciprocated by way of a drive rod extending axially through a suitable bore in the conveyor screw, and an anvil member is fixedly supported from the housing and extends into the discharge end of the latter to provide a bearing support for the inner axially reciprocated knife, for the drive rod by which axial reciprocation is imparted to both the inner knife and the nozzle body, and also for the adjacent end of the conveyor screw.

In accordance with another feature of this invention, an elastic ring is disposed within the annular space defined between the inner reciprocated knife, the fixed knife at the discharge end of the housing and the annular or cylindrical nozzle body so that such elastic ring defines the radial wall surface of the annular space at the side of the latter away from the fixed knife at the discharge end of the housing, and the resilience of the elastic ring prevents the exertion of harmful pressure upon the cut food material as the latter passes through the annular space.

Further, in accordance with the invention, the inner, reciprocated annular knife is turned in response to the reciprocation thereof thereby to provide a desirable scissor-like cooperation between the inner knife and the fixed knife at the discharge end of the housing.

The above, and other objects, features and advantages of the invention, will be apparent in the following detailed description of an illustrative embodiment thereof which is to be read in connection with the accompanying drawings forming a part hereof, and wherein.

Figure 1:
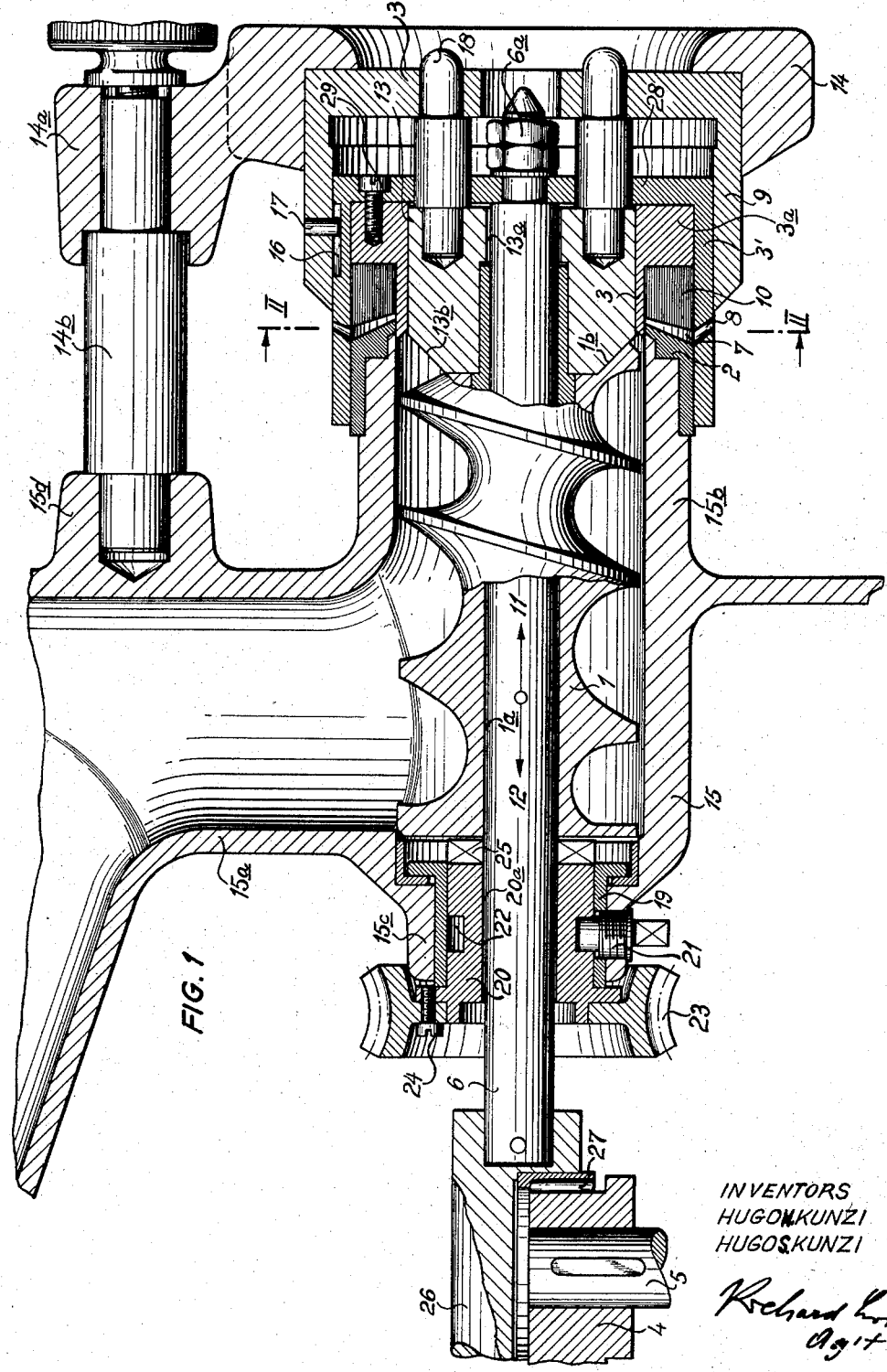
Fig. 1 is a longitudinal, vertical sectional view of a chopping machine embodying the present invention.
Figure 2:
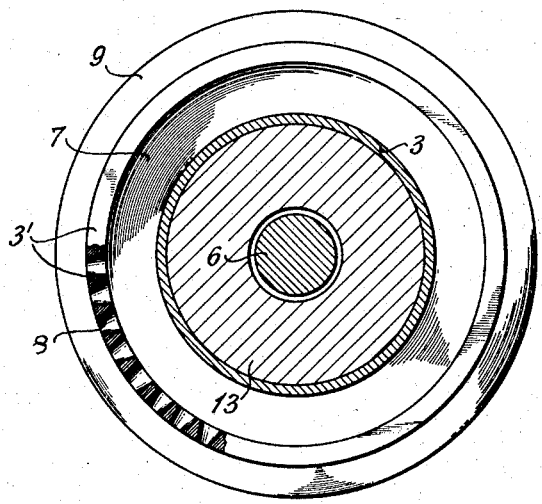
Fig. 2 is a transverse sectional view taken along the line II—II of Fig. 1.
Figure 3:
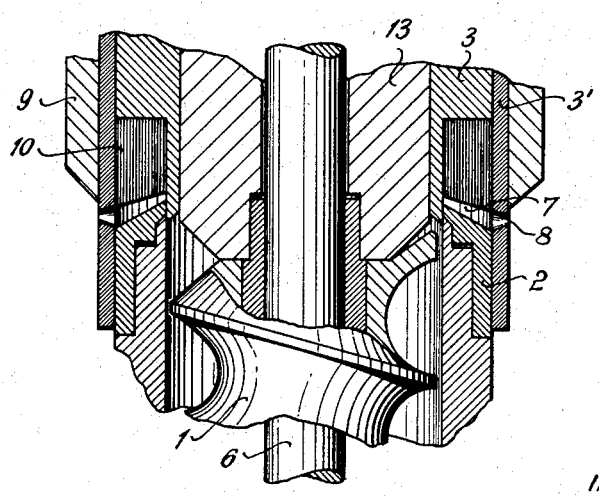
Fig. 3 is a fragmentary, longitudinal section view of the chopping machine of Figs. 1 and 2, but shown charged with meat or other food material being processed.

Referring to the drawings in detail, and initially to Figs. 1 and 2 thereof, it will be seen that a chopping machine embodying the present invention includes a housing 15 having a hopper 15a opening into a generally cylindrical portion 15b adjacent one end of the latter. A rotatable, helical conveyor screw 1 is disposed within the cylindrical portion 15b of the housing in order to feed food material from the hopper 15a toward the discharge end of the housing at the end of cylindrical portion 15b remote from the hopper. At the end remote from its discharge end, the cylindrical portion 15b of the housing is provided with an annular boss 15c receiving a bushing or bearing 19 in which a connecting member 20 is rotatable. The connecting member 20 is held against axial removal from the bushing 19 by means of a pin or stud 21 received in a capped radial opening in the boss 15c and extending into an annular groove 22 in the outer cylindrical surface of the connecting member 20. A worm gear 23 is secured, as by the screws 24, to the outer end of the connecting member 20, while the inner end of the connecting member and the adjacent end of the screw conveyor 1 are provided with interengageable coupling teeth, as represented at 25, for transmitting rotational movement from the gear 23 to the screw conveyor, while permitting axial removal of the latter from the housing through the discharge end of the housing. Thus, rotational movement of the conveyor screw 1 may be effected by a worm (not shown) meshing with the worm gear 23 and driven by a suitable electric motor (not shown).

The conveyor screw 1 is formed with an axial, open ended bore 1a, and the connecting member 20 is similarly formed with an open ended axial bore 20a so that a drive rod 6 can extend slidably through the aligned bores 1a and 20a.

At the end extending out of the connecting member 20, the drive rod 6 is secured to a head 26 which accommodates a roller bearing 27 arranged with its axis perpendicular to the longitudinal axis of the drive rod 6. An eccentric 4 is received within the roller bearing 27 and is secured on a rotated drive shaft 5 so that, in response to rotation of the latter, axial reciprocation will be imparted to the drive rod 6. Rotation of the drive shaft 5 can be effected by an electric motor (not shown) separate from the motor provided for effecting rotation of the conveyor screw 1, or by the same motor through a suitable gear transmission.

An annular knife 2 is fixed to the discharge end of the housing 15 and cooperates with an annular inner knife 3 which is dimensioned to telescope into the discharge end of the housing, as shown in Fig. 1. The annular inner knife 3 is slidably mounted upon, and supported by, an anvil member 13. A cylindrical nozzle body 3' telescopes slidably over the fixed annular knife 2 at the discharge end of housing 15 and is provided with a radial wall 28 at one end to which the inner knife 3 is secured, as by screws 29. An annular outer knife 9 extends around the nozzle body 3' and is provided with a radial wall 30, at its forward end, formed with suitable openings to receive studs 18 which extend from the anvil member 13 in order to mount the latter with respect to the outer knife 9. The outer knife 9 is received within a flanged ring 14 having at least one lug 14a thereon, and a securing screw 14b is rotatably mounted in each lug 14a for threadable engagement in a tapped boss 15d on the housing 15, thereby to secure the ring 14 with respect to the housing. Thus, the outer annular knife 9 and the anvil member 13 are supported in fixed positions adjacent the discharge end of the housing 15, while the inner annular knife 3 and the cylindrical nozzle body 3' are free to move axially relative to the housing, with the inner knife 3 sliding between the outer cylindrical surface of the anvil member 13 and the inner cutting edge of the fixed knife 2, and with the nozzle body 3' sliding between the outer surface of the knife 2 and the inner cutting edge of the outer annular knife 9.

As seen in Fig. 1, the anvil member 13 has a central, axial bore 13a through which the drive rod 6 slidably extends, and the latter is provided with a reduced diameter, threaded end portion received in a central aperture of the radial wall 28 of nozzle body 3' and secured to the latter by nuts 6a. Thus, the inner knife 3 and the nozzle body 3' are made to reciprocate axially with the rod 6.

Preferably, the inner end of anvil member 13 extending into the discharge end of housing 15 has a frusto-conical configuration, as at 13b, and the adjacent end of the conveyor screw 1 is formed with a correspondingly shaped recess or cavity 1b receiving the frusto-conical end 13b so that the anvil member 13 provides a bearing support for the adjacent end of the conveyor screw. It will be apparent that the anvil member 13, in addition to supporting the adjacent end of the conveyor screw, as described above, provides a support for the slidable inner knife 3 and for the adjacent end of the reciprocated drive rod 6.

As seen in Fig. 1, the annular inner knife 3 is provided with an annular, outwardly directed rim 3a so that an annular space 7 is defined which is limited by the confronting radial surfaces of the rim 3a and the knife 2 and by the outer and inner cylindrical surfaces of the knife 3 and the nozzle body 3', respectively. The body 3' is formed with a circularly arranged series of radial, nozzle-like openings 8 which, as shown in Fig. 2, decrease in cross sectional area toward the outer surface of the body 3' and which communicate, at their inner ends, with the annular space 7.

The illustrated embodiment of the invention is completed by an elastic ring 10, for example, of rubber or the like, which is received in the annular space 7 and abuts against the rim 3a of the inner knife 3. The ring 10 occupies only a portion of the annular space 7 so that an annular clearance remains between the elastic ring 10 and the confronting surface of the annular knife 2 to provide an annular, radially directed passage for the food material being processed.

Preferably, the inner knife 3 and the nozzle body 3' are turned about the axis of the drive rod 6 in response to reciprocation with the latter. In the illustrated embodiment of the invention, such turning or angular displacement of the nozzle body and inner knife is effected by a pin 17 which extends inwardly from the outer knife 9 and is slidably received in a spiral groove 16 formed in the outer surface of the nozzle body 3' (Fig. 1) so that, as the nozzle body is reciprocated relative to the fixed outer knife 9, the groove 16 and pin 17 cooperate to cause angular displacement of the nozzle body and knife 3 relative to the fixed knife 2.

As seen in Fig. 1, the annular clearance or passage remaining in space 7 between the elastic ring 10 and the confronting generally radial surface of knife 2 preferably increases in width in the radially outward direction, that is, in the direction of movement of the food material therethrough, and the width of such annular passage is alternately increased and decreased in response to axial reciprocation of the rod 6 in the directions of the arrows 11 and 12, respectively.

In operating the above described chopping machine, the drive shaft 5 is rotated to provide from 100 to 2,000 reciprocating strokes per minute of the drive rod 6. When the drive rod 6 moves forwardly in the direction of the arrow 11, the inner movable knife 3 moves away from the fixed knife 2 so that an annular opening is defined between the cutting edges of the knives 2 and 3 and the conveyor screw 1 propels food material through such annular opening into the annular passage within space 7. When the drive rod 6 returns in the direction of the arrow 12, the food material, for example, meat or the like, fed into the annular space 7 is sheared off by the cooperating action of the knives 2 and 3. Since the inner knife 3, when cooperating with the fixed knife 2 to provide a cutting action, closes the inner end of the annular passages in space 7 between the elastic ring 10 and the confronting surface of fixed knife 2, the sheared off food material in that annular passage is urged radially outward for extrusion through the openings 8. The elastic ring 10 defining one side of the radial passage through which the food material travels on its way to the nozzles 8 serves to limit the pressure exerted upon the food material by the reduction in the width of the annular passage resulting from movement of the rim 3a with the knife 3 in the direction of the arrow 12.

The nozzle openings 8 in body 3' are located so that, when the body 3' moves, in the direction of the arrow 12, with the inner knife 3 and the latter closes the inner end of the annular passage within space 7, such nozzle openings 8 will be exposed in back of the cutting edge of the outer fixed knife 9, thereby to permit the extrusion of the cut food material through the openings 8. When the drive rod 6 again moves in the direction of the arrow 11, the nozzle openings 8 move past the cutting edge of the fixed outer knife 9 and the latter shears or cuts off the food material that had been previously extruded through the nozzle openings.

It will be apparent that the turning movement imparted to the inner knife 3 and the nozzle body 3' in response to axial reciprocation thereof ensures that the cutting or shearing action of the cooperating knives 2 and 3 and of the outer knife 9 will be scissor-like, and therefore, of increased efficiency.

It will be apparent that the retaining ring 14 may be easily removed from the housing 15, thereby to permit replacement of the knives 3 and 9 and of the nozzle body 3' so that interchangeable nozzle bodies, having differently shaped or sized openings and corresponding knives can be employed for the processing of different food materials.

Although the embodiment of the invention illustrated in the drawings employs a conveyor screw 1 which is rotatable about a horizontal axis, it is apparent that the invention, as defined in the appended claims, may be similarly applied to a chopping machine having a vertically arranged conveyor screw. Further, although a particular embodiment of the invention has been described in detail herein with reference to the accompanying drawings, it is to be understood that various modifications and changes may be effected therein without departing from the scope or spirit of the invention, except as defined in the appended claims.

What is claimed is:

1. A food chopping machine comprising a housing having a discharge opening at one end, an annular fixed knife extending around said discharge opening, feed means for advancing food material to be chopped through said housing in the direction toward said discharge opening, an inner annular knife reciprocable axially with respect to said fixed knife and formed to telescope into said discharge opening, a cylindrical nozzle body telescoping over said one end of the housing and movable with said inner knife, said inner knife, fixed knife and nozzle body cooperating to define an annular space therebetween and said nozzle body having radial nozzles opening outwardly from said space, an outer annular knife extending around said nozzle body and fixed relative to said housing, and means operative to axially reciprocate said inner knife and nozzle body with respect to said fixed knife around the discharge opening and said outer fixed knife.

2. A food chopping machine comprising a generally cylindrical housing having a rotated conveyor screw therein for advancing food material to be chopped toward one end of said housing, a fixed annular knife extending around said one end of the housing, an inner annular knife formed to telescope into said one end of the housing in cooperative cutting relation to said fixed annular knife, a cylindrical nozzle body telescoping over said one end of the housing and cooperating with said inner annular knife and said fixed knife to define an annular space therebetween, said body having radial nozzles therein opening radially outward from said space, means for axially reciprocating said inner knife and nozzle body relative to said fixed annular knife so that said inner knife is moved away from and toward said fixed annular knife to alternately admit food material from said housing into said annular space and to shear-off the food material in said annular space, while the axial width of said annular space is increased, to receive the admitted material, and then decreased, to eject the sheared-off food material outwardly through said nozzles, and an outer annular knife fixed relative to said housing and extending around said nozzle body, said outer knife being located to uncover said nozzles, when said body and inner knife move in the axial direction for ejecting food material through said nozzles, and to shear-off the ejected food material when said body and said inner knife move in the opposite axial direction for increasing the axial width of said annular space.

3. A food chopping machine as in claim 2; wherein said conveyor screw has an axial bore extending therethrough, and said means for axially reciprocating said nozzle body and inner knife includes a reciprocated drive rod extending slidably through said axial bore of the conveyor screw.

4. A food chopping machine as in claim 3; further comprising an anvil member extending into said one end of the housing, and means supporting said anvil member in fixed concentric relation to said housing, said anvil member having a cylindrical surface slidably supporting said inner annular knife and a bore extending axially therethrough and slidably receiving said drive rod to support the latter.

5. A food chopping machine as in claim 4; wherein said anvil member has a frusto-conical inner end to direct the food material advanced by said screw toward the cooperating inner knife and the fixed knife extending around said one end of the housing, and said conveyor screw has a frusto-conical recess at the end thereof adjacent said one end of the housing and receiving said frusto-conical end of the anvil member so that the latter serves also as a bearing support for the conveyor screw.

6. A food chopping machine as in claim 5; wherein said means supporting the anvil member includes a flanged ring receiving said outer annular knife, means detachably securing said flanged ring on said housing, said flanged ring having axial openings therein, and studs threadably attached to said anvil member and removably received in said axail openings of the flanged ring.

7. A food chopping machine as in claim 2; further comprising an elastic ring in said annular space at the side of the latter remote from said fixed annular knife extending around said one end of the housing to cushion the pressure applied to the food material in said space during the ejecting of the food material through said nozzles.

8. A food chopping machine as in claim 2; further comprising means for angularly turning said nozzle body and inner annular knife relative to said fixed outer knife and said knife extending around said one end of the housing in response to axial reciprocation of said nozzle body and inner annular knife, thereby to achieve a scissor-like shearing action.

9. A food chopping machine as in claim 8; wherein said nozzle body and inner annular knife are secured together, and said means for angularly turning the nozzle body and inner knife includes a pin projecting radially inward from said fixed outer knife, said nozzle body having a spiral groove slidably receiving said pin.

10. A food chopping machine as in claim 2; wherein said nozzle body and inner knife are secured together and said conveyor screw has an axial bore extending therethrough; and wherein said means for axially reciprocating the nozzle body and inner knife includes a drive rod extending slidably through said axial bore of the convyeor screw, means securing one end of said drive rod to said nozzle body, a drive shaft rotated about an axis at right angles to the axis of said drive rod, an eccentric on said drive shaft, and means on the other end of said drive rod engaged by said eccentric and effecting axial reciprocation of said drive rod in response to rotation of said eccentric.

No references cited.